INVENTOR
Francis V. Bugg

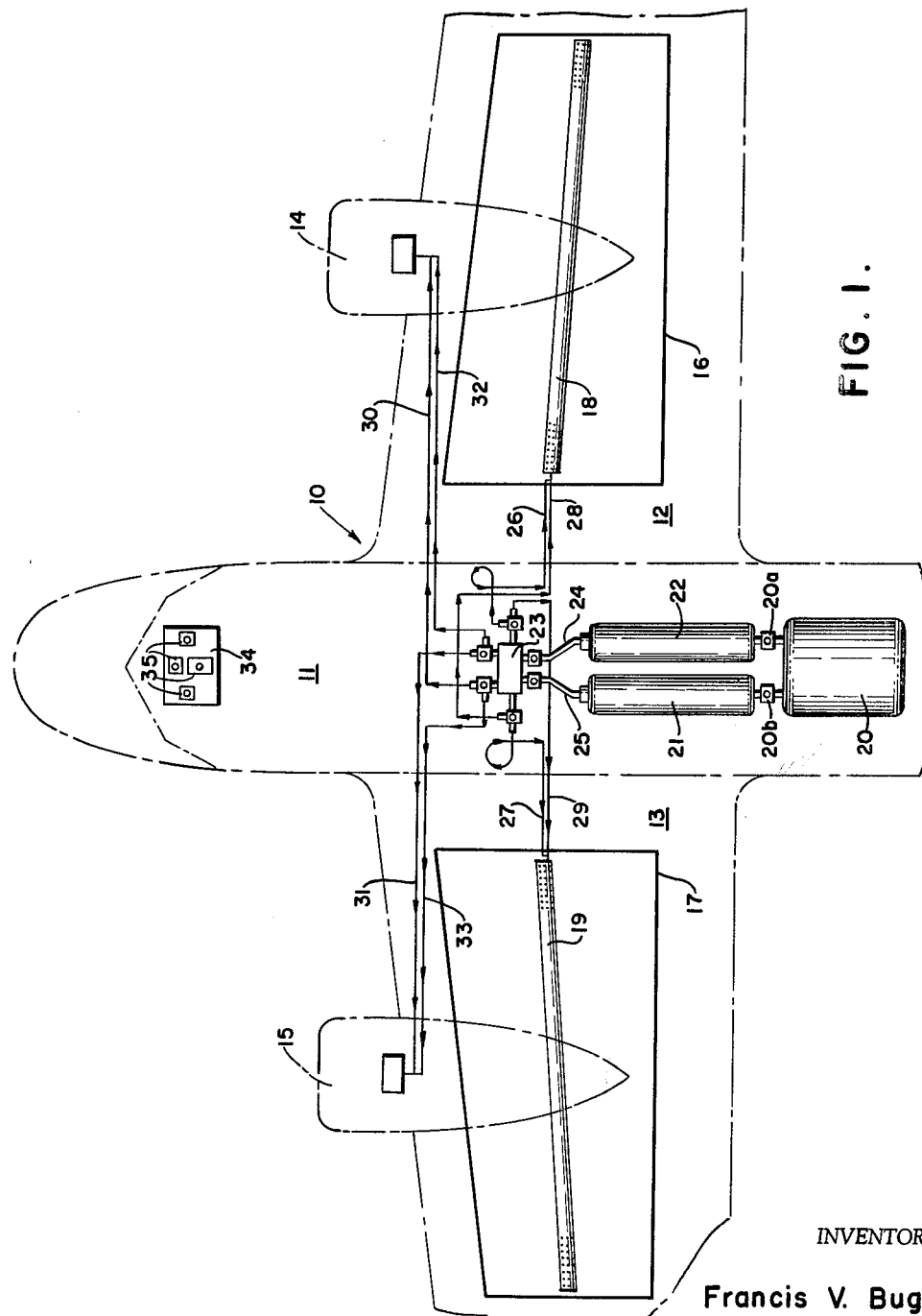
FIG. I.
INVENTOR
Francis V. Bugg

United States Patent Office 3,174,550
Patented Mar. 23, 1965

3,174,550
METHOD AND APPARATUS FOR RENDERING AVIATION FUEL FROM A FLOWABLE TO A NON-FLOWABLE STATE
Francis V. Bugg, Manasquan, N.J., assignor to Jet-Set Ltd., Long Branch, N.J., a corporation of New Jersey
Filed Aug. 22, 1961, Ser. No. 133,159
8 Claims. (Cl. 169—2)

The present invention relates to method and apparatus for rendering aviation fuel from a flowable to a non-flowable state while an aircraft is in flight or on the ground should collision or crash become imminent and has for an object to provide an increased safety factor in commercial and private air traffic as related to fires or other type of combustion or explosions incurred by most aircraft involved in uncontrolled crashes, crash landings and other mishaps encountered in air traffic.

Another object of the present invention is to provide a method and apparatus for the prevention of any type of fuel explosion which may occur in either automobile or trucking accidents and to also provide a fire fighting or inhibiting foam or composition of matter which may be employed in the fighting of aircraft fires.

In designing or considering fire prevention systems for aircraft, weight is perhaps the most important factor to be taken into consideration. The weight of the chemicals and containers combined or a sufficient amount of these chemicals and respective containers to completely neutralize all fires found both in the aircraft tanks and carburetors should not exceed an approximate two hundred to one ratio of the total fuel load or weight.

The method and apparatus of the present invention will eliminate the danger of spilled fuel from ruptured tanks igniting, as it would be transformed into a cellular rigid mass of non-flammable characteristics. The immediate advantage of this method and apparatus is the complete and immediate elimination of any type of fuel fire. This coupled together with the psychological factors in relation to passengers will render the fire protective system highly advantageous on all types of commercial aircraft.

The method and apparatus of the instant invention employs the combination of chemicals from two sources and mixture immediately prior to their injection into the fuel tanks of the aircraft in such a manner that the reactive effect between the two chemical materials will take place immediately upon being placed in combination in the environment of the fuel.

I have found that a most satisfactory form of pressure or compressing agent to urge the chemicals into combination and to force the combination into the fuel tank system is that of carbon dioxide or methyl bromide. Most aircraft are presently equipped with some carbon dioxide methyl bromide equipment.

As the chemicals from two separate reservoirs are incorporated either in or just prior to entry into the fuel a fast reaction simply described as foaming takes place within one to two seconds then sets up into a semi-solid sponge like substance with definite flame retardant and smothering characteristics. The foam as it shall be called also possesses the ability to soak up or envelope the fuel and traps more portions of the fuel into its cellular mass or in other words each cell traps and holds a portion of fuel where it is mixed with other light retardants or smothering agents. The cellular mass or size of the cells can be regulated closely through control of chemical ratios described more fully hereinafter. This aspect of the research of the instant application has been one of the more complicated fields of development as it required ascertaining the most practical and efficient cellular construction to completely trap and envelop the fuel and fully neutralize it altogether. This also has a lot to do with the aforementioned weight factor so that the method and apparatus of the present system will provide the correct cellular mass with the least gross weight.

Referring for the moment to the drawings.

FIGURE 1 is a top plan schematic view with parts broken away showing a two engine type aircraft equipped with the fuel solidification system of the present invention.

Figure 3:
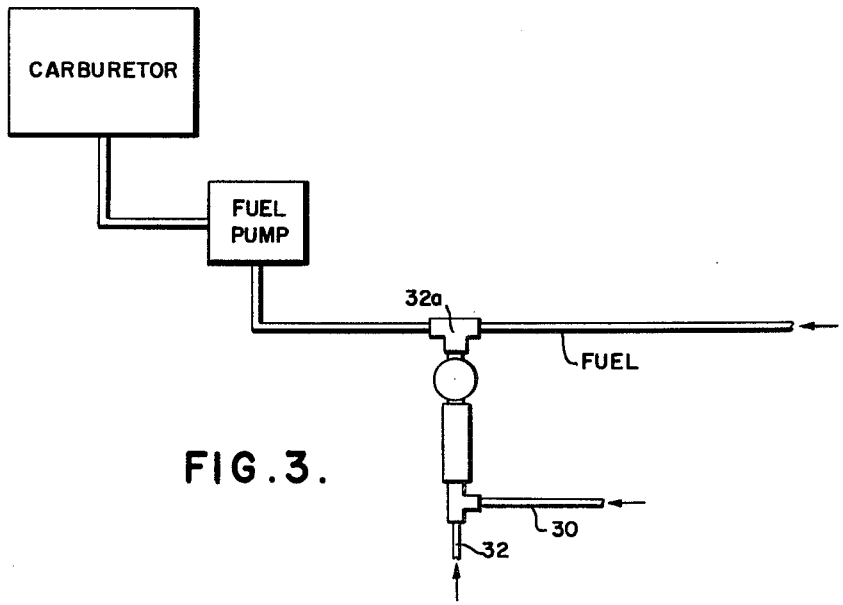
FIGURE 3 is a line diagram showing the introduction of the fuel solidification system into the carburetor in the cell structure as well as the fuel pump of each aircraft engine.
Figure 2:
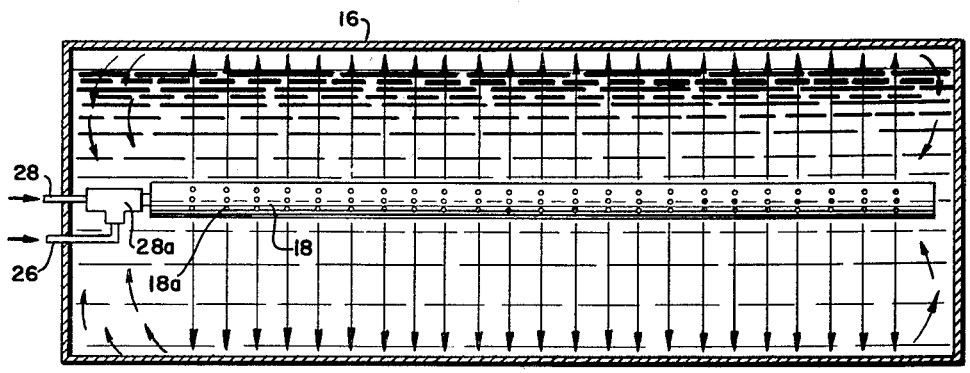
FIGURE 2 is a vertical cross section taken through a wing type fuel tank of the aircraft of FIGURE 1 showing parts broken away and parts shown in section of the introduction of the fuel solidification chemicals into the fuel.

Referring now to FIGURE 1, 10 designates a two engine type aircraft having a fuselage 11 and wings 12 and 13. Mounted on wing 12 and carried thereby is an engine nacelle housing 14 while mounted and carried by wing 13 is an engine nacelle housing 15. Contained within the aero dynamically faired structure of the wing 12 is a fuel tank 16. Contained within the aero dynamically faired wing structure of the wing 13 is a fuel tank 17. Extending substantially over the length of the wing tanks 16 and 17 are two injector diffuser tube members 18 and 19 each having openings about their peripheral surfaces which openings extend from the radius of the tubing outwardly and the tubing as shown in FIGURE 2 is hollow in cross section.

Carried within the fuselage or mounted in smaller units within the engine nacelle housings 14 and 15 is a propellent containing reservoir 20 which may contain either carbon dioxide gas or methyl bromide gas. The container 20 is connected to lines 20a and 20b to two chemical containing reservoir vessels 21 and 22. The chemical containing reservoirs 21 and 22 are connected to a valve manifold 23 through lines 24 and 25. Extending from the manifold 23 to the injector diffuser tube 18 in the right wing are two chemical lines 26 and 28, one leading from the manifold and in communication with one of the chemical reservoirs while the other line 28 is connected to the other of the chemical reservoirs through the manifold 23. The manifold 23 is controlled by solenoid actuated valves which place the chemicals under pressure in communication with the lines leading to the fuel tanks. Contained in the cockpit of the aircraft is a panel 34 having operating switches 35 thereon. The switches 35 will selectively place the right or left wing tank in communication with the chemical containing reservoirs as necessary upon the discretion of the pilot.

The left wing tank 17 and its injector diffuser tube are connected to the two chemical reservoirs 21 and 22 through lines 27 and 29 which lead from the manifold 23 to the left wing tank 17.

Each of the engine nacelles and their respective fuel pumps and carburetors are connected to lines in communication with the manifold 23 and hence the two chemical reservoirs 21 and 22 as for instance nacelle housing 24 is connected through lines 30 and 32 while the nacelle of the left engine 15 is supplied through lines 31, 33. Each of the chemical reservoirs 21 and 22 is under the influence of the pressure in the reservoir 20 once the solenoid control valves 20a and 20b are opened.

When in the course to flight, the pilot feels a collison or crash is imminent he will energize the switches 35 on panel 34 which will place the reservoirs 21 and 22 in communication with the pressure reservoir 20 by actuating solenoids which open the valves 20*a* and 20*b* placing the pressure contained in the reservoir 20 on the two chemical containing reservoirs. The two reservoirs then are placed in communication with the manifold 23 and by selective arrangement, the chemical from reservoirs 21 and 22 are then sent immediately to the fuel tanks 16 and/or 17 as the case may be and to the nacelle housings 14 and 15 either or both thereof as the case may be. When the solenoid valves at the manifold 23 are actuated the chemicals are then sent through the two lines for instance in tank 16, lines 26 and 28 as shown in FIGURE 2 will direct the two chemicals to a mixing T connection 28*a* where under the pressure of the propellent from chamber 20 the two chemicals in mixed condition will travel down the tube and be directed radially outwardly in the direction of the arrows shown in FIGURE 2 to form a foam to entrap and encapsulate the fuel contained in the fuel tank 16. This can simultaneously take place in tank 17 or only in tank 16 at the discretion of the pilot.

If it is a localized engine fire and the pilot wishes not to set up the fuel tanks in a solid state the lines 30 and 32 feed in through a T connection 32*a* which mixes the two chemicals from chambers 21 and 22 and introduces them into the fuel pumps and carburetors of the respective engines either simultaneously or singly as the case may demand.

I am aware that specifically various types of injector nozzles may be employed to assure full circulation of the two chemicals about the tank to ensure proper diffusion and generation of the foam structure which will encapsulate the fuel.

The system and apparatus of the present invention in addition to encapsulating the fuel in a foam-like structure which will set up and solidify rapidly, extreme advantage is found in that in over water flights should ditching become imminent the setting of the fuel up from a liquid to a foam-like state would render the wing of the aircraft more buoyant and would therefore tend to keep the aircraft afloat for a longer period of time permitting the escape of all people before the aircraft sinks.

In determining what chemicals may best be placed in the chemical containing reservoirs 21 and 22, I have determined as an operative form of chemicals that a polyurethane resin may be employed in the vessel 21 while a polyisocyanate and catalyst plus blower may be employed in the fluid or chemical containing chamber 22.

By way of examples of chemicals which may be employed in the respective chambers the following are given as chemical examples:

Components and ratios employing isocyanate-hydroxyls as chief reactants in fuel solidification.

(1)

Materials:

| | |
|---|---|
| Polyether resin | Reichhold Chem. #8605 |
| Isocyanate group | Reichhold Chem. #8625 |
| Water, distilled— | |
| Catalyzing agent (basically amine) | Reichhold Chem. #8640 |

Other catalysts:
- Tri-ethylamine $C_2H_5N_3$ (Union Carbide Co.)
- Triethylene diamine $C_6H_{12}N_2$ (Atlas Powder Co., Wilmington)
- Ethylene glycol
- Polyoxyethylene "Sorbitan" monolaurate (Atlas Powder Co.)

(2)

Procedures:

A stable nucleus about which extremes, both the lower and higher ratios, in formulation will revolve is as follows (for large volumes of foam):

| | Cubic centimeters |
|---|---|
| $H_2O$, distilled | 70 |
| $C_2H_5N_3$ | 50 |
| $C_2H_4(OH)_2$ | 48 |
| Polyoxyethylene monolaurate | 50 |
| Reichhold #8640 | 32 |
| Total | 250 |

This above mix is added to approx. 750 cc. of the basic polyether #8605, resulting on one litre of the total resin component.

This one litre of mix is then added to approximately 1500 cc. of the isocyanate group when a foam is desired. (This results in a rather low density foam with a high expansion ratio and open celled construction.)

However, as flexibles in the density aspect, ratios and percentages of the isocyanate to the polyether shall be from 2 litres isocyanate per one litre of polyether as an extreme low in densities, up to a 50–50 basis of isocyanate to polyether mix in the higher densities.

In the catalyzing-acceleration agent, when employing $C_2H_5N_3$, a percentage ratio, based on the total mix, should not exceed 2.5%.

In the $H_2O$ component, ratios in the lower density foams should not exceed 7.5% based on the polyether and isocyanate mix, or the higher densities, $H_2O$ ratios will not be below 0.4%.

The #8640 component is extremely variable in its application, however an extreme low in ratio would be approximately 1%.

Insofar as the $C_2H_4(OH)_2$ component is concerned, its prime purpose here is to serve as a diluent to the polyether to match viscosities with the isocyanates for propulsion purposes. The stated ratio is to be considered as a high, and whenever practical, lower ratios should be employed.

NOTE.—These formulations are designed for spray application, and it seems that the finer division of same spray the lower concentration of $C_2H_5N_3$ may be effected.

When incorporating these mixtures, a form of good fast mixing must be employed as the reaction is extremely fast and expansion correspondingly so, however bearing in mind that over mixing of components may result is "over blowing" and consequent collapse of foams.

(3)

The above formulations are designed to be in conjunction with an inert gas propellent, non-supportive of combustion, such as $CO_2$, methyl bromide, etc., however, if "Freon" is to be used as chief means of propulsion, several provisions as to the mixing of same with these isocyanatehydroxyl groups will have to be adhered to.

$CCL_2F_2$ atmosphere, compressed, may be used alone in the expulsion of all liquid chemicals from their reservoirs without any changes in the above formulations. It may also be used in its liquid form directly in the mixtures as either a replacement for the $H_2O$ or in various ratios with same. The following treats the latter, or water/Freon in conjunction with a Freon propellent (or other gas, if deemed suitable). The previously stated formulations will remain unchanged with the exception that the water component in the polyether will be dropped approximately 30–40% and the liquid $CCL_2F_2$ will be incorporated directly in the isocyanate group in ratios from 25% of the isocyanate weight for extremely low density foams, downward to 5% for the higher densities.

In relation to the fuel solidification phases; the effect desired, in the introduction of foams, is a "spray," or finely divided stream of the freshly admixed components, entering into the fuel container from multiple discharge orifices situated above the fuel level.

The physical aspects and field of coverage of these mixed chemical sprays would be as follows:

The deflection of these semi-liquids, when issuing from said orifices, to be regulated in angle of field of coverage so as to be in conjunction with the other orifice field of coverage resulting, in toto, in an even as possible coverage of the liquid fuel surfaces, confined within said tank, with same chemicals, and at the same time filling all remote corners and limitations of the liquid to the tank's structural limitations.

The desirability of "spraying" the partially reacted and developed foams above the fuel level are several fold:

A spray effect, coupled with a fast reacting formulation, will result in a much larger realization of expansion potential and immediate embryonic cellular evolvement immediately before introduction to a liquid medium, as opposed to dumping a foaming compound into a fuel in a large body through a single discharge orifice without said "spray" effect.

Also, a "boost" in the reaction and evolvement times associated with any given formulation being sprayed is arrived at through the freshly admixed and sprayed components being mixed with, or "seeded" by the atmosphere present immediately prior to its coming into contact with a liquid in said tank. This spraying and its associated limited seeding with an atmosphere, either present within a void or perhaps aspirated without pressure into the mixtures immediately prior to injection, is a definite factor to be taken into consideration when attempting to evolve maximum potential from any formulation.

In the spray coverage phase and the associated evenness thereof desired, this seems to result in a combative effect of the "heat sink" effects of large bodies of fuel(s) exerting a crippling premature cooling action upon the foam's necessary exothermic qualities conducive to evolution. When the foams are cooled too quickly during their progressive formation, expansion ratios, cellular evolvement and release of carbon dioxide, etc., are rendered on a definite downward scale. This, however, seems to apply only to the lower temperature ranges of fuels.

The specific advantages of spraying as chief introductory means as a combating factor of the "cooling" effect is thus:

(Time constants here being in categories of a second or so and fractions thereof.)

As these partially developed foams, whose cellular development has begun, come into contact with a liquid body of a lower temperature than the chemicals themselves, the first small volume of semi-liquid foams must be expected to be sacrificed to this same cooling effect, in that this small initial volume would not be expected to expand fully, however realizing but a fraction of its expansion potential. This however small, will consist of rather small permeable cellular bodies (as an "open celled" formulation is called for). This resultant body of prematurely terminated reaction foams forms a "floor" on the surface of the liquid fuel and can be termed as self supporting for short durations. (The necessity of complete surface coverage is then apparent.) As this "floor" builds up in thickness upon the liquid surface, perhaps in the order of ⅛″ to 1″ or so in thickness, depending upon the liquid body temperature, this tends to serve as a thermo insulating blanket, or wall, for the short time constants involved, thereby blocking the effects of cold liquids upon the exotherm necessary for full expansion in the following, or upper, layers of developing foam, as well as serving as a line of demarcation between the cool liquids and the now somewhat elevated temperatures in the upper layers created by the exotherm.

As these now developing foams, terminated at partial expansion and hardened at the floor level and still in embryo stages nearest their ejection orifices and expanding rapidly, this build up of foam results in a downward movement of the "floor" and attached block of cells into the depths of the liquid fuels, this downward movement terminating by the floor coming into intimate contact with the bottom most end of said fuel tank. The foaming process is terminated by exhaustion of the chemical reservoirs, the capacity of these in conjunction with specific charge ratios to a given area, as, bearing in mind that these ratios are based on void capacity, not the liquid contained therein.

This resultant action is one of a complete filling of all areas of a given confine, the cellular containment of said fuels as well as the atmosphere or "boundary layer" above the liquid level, in said tank, as one. Also in conjunction with this cellular-fuel mass are the comparatively large volumes of carbon dioxide, reaction produced, being distributed throughout said mass both in the cellular-fuel and cellular-atmosphere body. Also introduced into the confines of said tank and therein contained developed substance are the gases employed in propelling the chemicals to the fuels, thereby creating an internal atmosphere within said masses and tank, inert to ignition, as opposed to the normally flammable and explosive atmosphere commonly associated with partially filled fuel tanks. (These propellent gases being $CO_2$, methyl bromide, CBM, Freon, etc.)

In explanation of the aforementioned "downward" movement of said foam block into the depths of the fuels, the physics are such that the formulation employed in said foams are proportioned conducive to an "open celled," permeable individual cell wall structure, this characteristic also applying to the "floor" substance. This "block" being permeable to liquids of light viscosity, the entire action is one of compression, through forcible volume build up, of a permeable multi-cellular body, in intimate contact with all vertical tank walls, upon a liquid body. The integrating action here is where the liquid body has but one recourse; upward into the permeable cellular body. This effect is commensurate with the inherent capillary attraction abilities of a porous cellular body, said attraction being hastened by the forcing downward of the block upon the liquid body.

The gross effect, for practical purposes, is one whereby the fuels are "solidified," as a block of substance other than its normal liquid form, these fuels being entrapped or encapsulated in the cellular structures "en masse" along with any atmosphere present within the tank. This same atmosphere is also diluted with the reaction produced combustion suppressant gases and chemical propellents.

Structural efficiency, will have to be of a degree sufficient to retain integrity of said mass during varying degrees of trauma, as associated with air carrier accidents, or at least to keep the break-up of the masses contained in the tank to a minimum and prevent the possibility of a severely ruptured tank's tendency to spray or "mist" its therein contained fuels to the atmosphere, a leading cause of impact fires. Upon extreme tearing of a tank, the solidified mass will, of course, break up in large pieces (dependant upon specific densities and structural strengths of the foams), however, their scattering and course of expulsion, trajectory, and most important, degree of coverage about an aircraft's wreckage will be totally different from that of a volatile liquid being expelled from a broken tank, i.e.: A liquid's tendency to vaporize, splash and otherwise adhere to surfaces when liberated is directly in opposition to the physical characteristics of a number of large pieces of solid material being liberated or expelled from a tank under the same conditions. They will tend to bounce from surfaces, spread of these pieces is also limited, vaporization of therein contained volatiles held to a minimum, and the pieces are not subject to the formation of pools or interconnecting bodies, as are liquids—therefore limiting the danger of fire or the spread of same.

However, the structural characteristics of the foams themselves are extremely flexible, as to degrees thereof attainable through formulation. As extremes, structural resiliency approximating foam rubber to densities associated with some of the ceramics are possible. These characteristic desired are to be left to experimentation in each case to arrive at a norm suited to a particular aircraft application. However, it may be found that a rigid foam with a medium (20–50 p.s.i.) compressive strength, or upwards, would be desirable, this phase being accomplished by varying polyether and isocyanate ratios alone.

This previously described "floor" effect of the first issuance of foams into a liquid body is not absolutely necessary in this application, being materially beneficial to the secondary objectiveness (lightness) of the system was apparent, and, to date, there is no other injection system that would be practical in design to meet the objective, i.e. the complete filling of a void and containment of liquids therein with a cellular expansive substance with as small as possible chemical volume and inherent storage weights in an unreacted state.

As various formulations, in the thinner cell walled lighter density foams have tremendous expansion ratios over their original liquid volume—as much as 200 times the original, these then and fractions downward, would be the most likely for use in aircraft applications due to the smaller weight penalties associated with smaller chemical volumes. However, expansion ratios, as determined through formulation, will for reasons of strength, be a minimum of 100 times original liquid volume and slightly upward, this then results in a contraction ratio of liquid chemicals to any given void area in the order of 1% or less. It must be borne in mind that as the expansion ratios increase (nearer 200 times), structural efficiency and strength-densities decrease, thereby rendering the higher expansions impractical to said applications. These expansion factors are governed by ratios of "blower" component ($H_2O$, Freon, etc.,), and accelerating catalyst (amine groups) to the basic polyether resin.

The peculiarities of these polyether-isocyanate group reactions are many. Over mixing of the total mixtures when a reaction is desired, can result in a collapsing of foams, excessive blow through the evaporating volatiles, etc., thereby destroying their intended object. On the other hand, under mixing often results in slow reaction times, incomplete reactions, these usually wasteful of potential.

These isocyanate-hydroxyl reactions in my employ were changed in formulation, quite considerably, from standards commonly associated with industrial applications to suit this particular application.

The first of these departures from standard procedure was to decrease the reaction and full expansion time constants, as opposed to the common industrial norm of "slow" reaction times. In my applications, time constants deemed necessary are in the neighborhood of 1–2 seconds, or less, however without sacrifices to foam characteristics. This will be arrived at *not* by the use of heavy metals such as stannous tin dilaurate, etc., as the increase of degree in exotherm is inadvisable and often results in poor foams.

However, in the accelerating agents, tri-ethylamine, $(C_2H_5)_3N$, was employed with good results in amounts larger than the norms set down by industrial applications as well as the use, (perhaps the best), of triethylenediammine (1,4 diazabicyclo 2,2,2 octane) as the chief catalyst between the two compounds, an excellent intermediate due perhaps to its high specific reactivity with polyethers and diisocyanates and water and also seems to accelerate chain growth and $CO_2$ evolution even more substantially than tri-ethylamine. This then is also employed in amounts higher than set down in industrial norms. These being in conjunction with polyethers of a mid range mole wt. thinned by the addition of ethylene glycol in amounts to match viscosities with the TDI, for propulsion purposes. (Ease in matching flow rates.)

The blower, or water, or water/Freon content has been kept to rather common industrial high limits and an alternate consisting of isopropyl alcohol may be employed as "blower," however, in amounts slightly higher than with water, etc.

An open celled structure, as necessary to this application, is again contrary to procedures and characteristics as associated with standard industrial procedures. To attain this same open celled structure, the use of polyoxyethylene "Sorbitan" monolaurate is indicated, this being employed in fairly large ratios to the polyether, incorporated directly therein with the resin, water, and catalyst. This "Sorbitan" component does not materially effect viscosities of the polyether even in said fairly large amounts as it is of near equal consistency to the polyethers.

For ease in propelling the two separated fluids from their respective containers to their objective, at least in conjunction with my rather limited apparatus, viscosities between the diisocyanate component and the polyether group with all additions were equalized by the use of ethylene glycol being added to the polyether in amounts necessary for said equalization. However, it must be borne in mind that that too high a level of ethylene glycol concentration to the polyether will result in a weak collapsing foam, therefore necessitating employing as low a concentration as possible to effect viscosity equalization.

Figure 5:
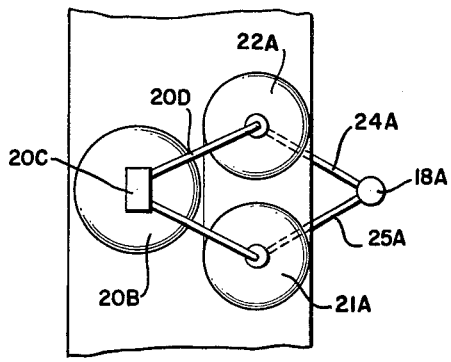
FIGURE 5 is a top plan view of the chemical storage reservoirs employed in the platform of the tank of FIGURE 4.
Figure 4:
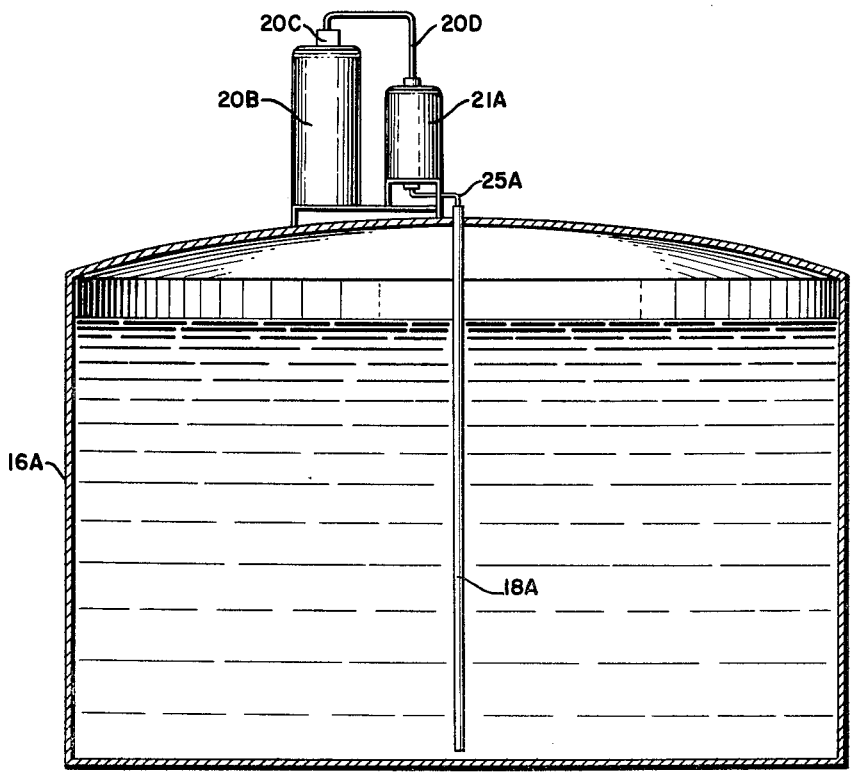
FIGURE 4 is a vertical cross section taken through a gasoline reservoir or tank employed on the ground for stopping fire in such tank.

Referring now to FIGURES 4 and 5, 16A denotes a fuel reservoir such as may be found on a gasoline storage tank farm and which may also be a tank on a tank truck or rail tank car, into which is inserted a distributor or injector diffuser tube 18A, which tube is in communication with bifurcated supply lines 24A, 25A to the two reactive cellular generating storage vessels 21A, 22A which are subject to pressurization from a propellant reservoir or gas tank 20B when solenoid controlled valve 20C is opened through lines 20D.

When fire or other destruction of the vessel containing flammable liquid is imminent the valve 20C is opened placing the propellant gas in tank 20B into the storage vessels 21A, 22A causing their contents to be mixed and to flow into the diffuser tube 18A to commence generating the cellular mass to encapsulate the volatile liquid in the tank. Small pressure seals are placed at the bottom of each storage vessel which will not rupture under the static weight load of the contents of each storage vessel but which will rupture when the storage vessel is pressurized by the gas from the tank 20B to permit commingling of the two reactive substances since these substances in tanks 21A and 22A are the same as that contained in 21 and 22 of FIGURE 1.

While I have shown in FIGURES 1 and 2 one form of the mechanical means for introducing the chemicals into the fuel tanks, it will be understood that modifications will be made in which the chemicals which are reactive with one another may be introduced above the fuel level. The injection nozzles which may be employed in lieu of the diffuser tubes 18 and 19 may be placed at various stations along the wing tank or within the reservoirs containing the fuel to be set up.

While many of the illustrations given in the specification relate to isocyanate hydroxyl reactions and while these reagents are excellent for use in this application, it is possible that other chemicals may be employed which will provide more advantageous characteristics in dealing with exotherm. The necessity of ultimate and critical injection or spray principles in conjunction to overcome any lacking in the full utilization of the necessary exotherm may be overcome by the use of other specific chemicals, for example, some of the phenol resins and particularly of the phenol-formaldehyde-acid groups.

One important aspect of my invention is the encapsulation of the liquid aviation fuel and setting the same up into a substantially solid state in which the chemical reagents employed for setting up the fuel are inert and themselves non-combustible.

Although I have disclosed herein the best form of the invention known to me at this time, I reserve the right to

What is claimed is:

1. The method of preserving human life from suffocation and burning during and after aircraft collisions with ground or other aircraft by conversion of the aircraft fuel from a flammable volatile liquid state to a substantially rigid encapsulated non-flowable state which comprises
   (a) co-mixing at least two chemically reactive foam expanding substances which upon mixing expand into and set up as a cellular substantially solid mass, and
   (b) introducing the co-mixed substances into the fuel tanks of the aircraft containing the flammable liquid fuel whose physical characteristics are to be changed so that the volatile fuel contained in the fuel tanks of the aircraft will be encapsulated and immobilized from flowing by the foam expanded substances.

2. The method of claim 1 wherein the two chemically reactive foam expanding substances expand to substantially fill the internal area of the fuel tanks of the aircraft so that the entire interior of each tank is a substantially solid mass of plastic encapsulations trapping both fuel and fumes above the fuel in the tanks into a substantially solid mass.

3. For use with aircraft, an apparatus for preserving human life from suffocation and burning during and after aircraft collisions with ground or other aircraft by conversion of the aircraft fuel from a flammable volatile liquid state to a substantially rigid encapsulated non-flowable state, comprising
   (a) reservoir means carried by said aircraft for containing two chemically reactive foam expanding substances which substances upon mixing expand into and set up as a cellular substantially solid mass,
   (b) co-mixing means in communication with said reservoir means for co-mixing said two chemically reactive substances, and
   (c) introducing means connected to receive the co-mixed chemicals from said co-mixing means for introducing the co-mixed substances into the fuel tanks of the aircraft containing the flammable liquid fuel whose physical characteristics are to be changed so that the volatile fuel contained in the fuel tanks of the aircraft will be encapsulated and immobilized from flowing by the foam expanded substances.

4. An apparatus as claimed in claim 3 wherein one of said reactive foam expanding substances is polyurethane resin.

5. An apparatus as claimed in claim 4 wherein the other reactive foam expanding substance is toluene diisocyanate.

6. An apparatus as claimed in claim 3 wherein said co-mixing means includes carbon dioxide as a propellant.

7. An apparatus as claimed in claim 3 wherein one of said reactive foam expanding substances is a mixture of maleic anhydride and ethylene glycol.

8. An apparatus as claimed in claim 3 wherein one of said reactive foam expanding substances is a polyether resin.

References Cited in the file of this patent
UNITED STATES PATENTS

| | | |
|---|---|---|
| 1,115,887 | Bartels | Nov. 3, 1914 |
| 1,752,263 | Patterson | Mar. 25, 1930 |
| 1,889,101 | Moeller | Nov. 29, 1932 |